Oct. 6, 1936.    H. A. FARRAND    2,056,844
TRANSMISSION MECHANISM
Filed Dec. 26, 1935    5 Sheets—Sheet 1
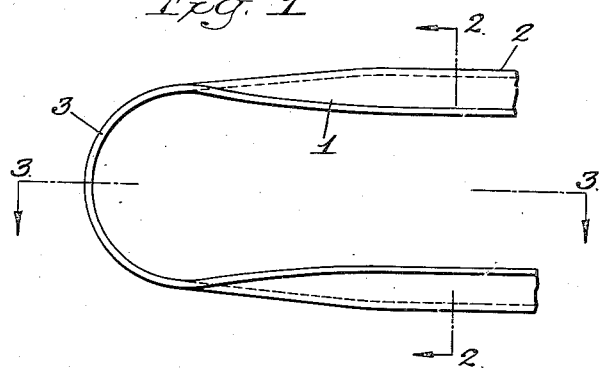
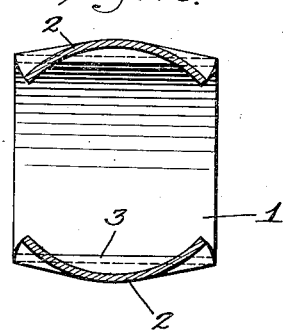
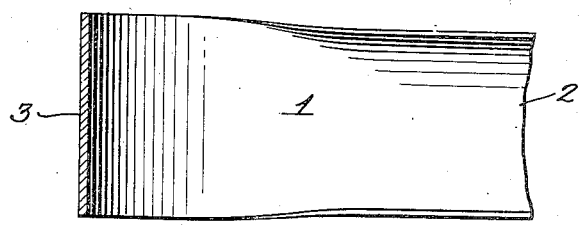
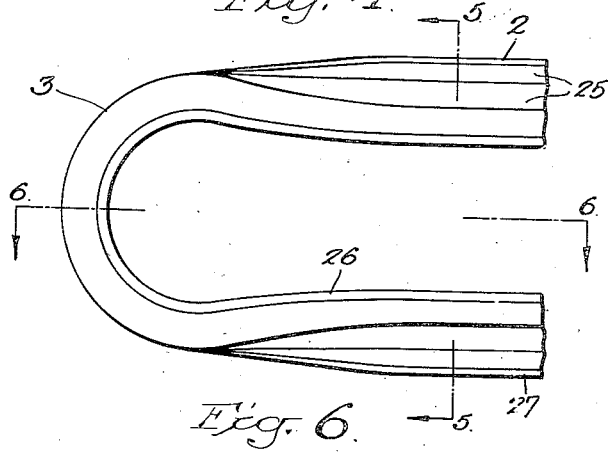
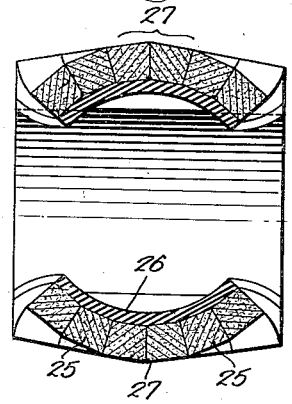
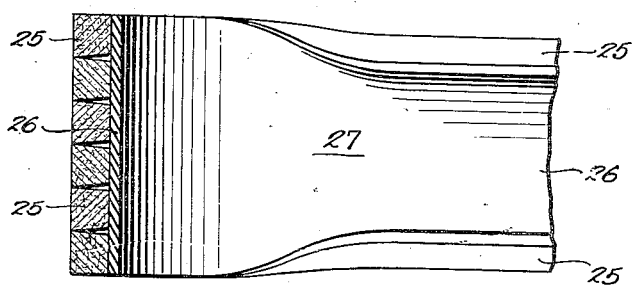
Inventor:
Hiram A. Farrand
by his Attorneys.
Howson & Howson

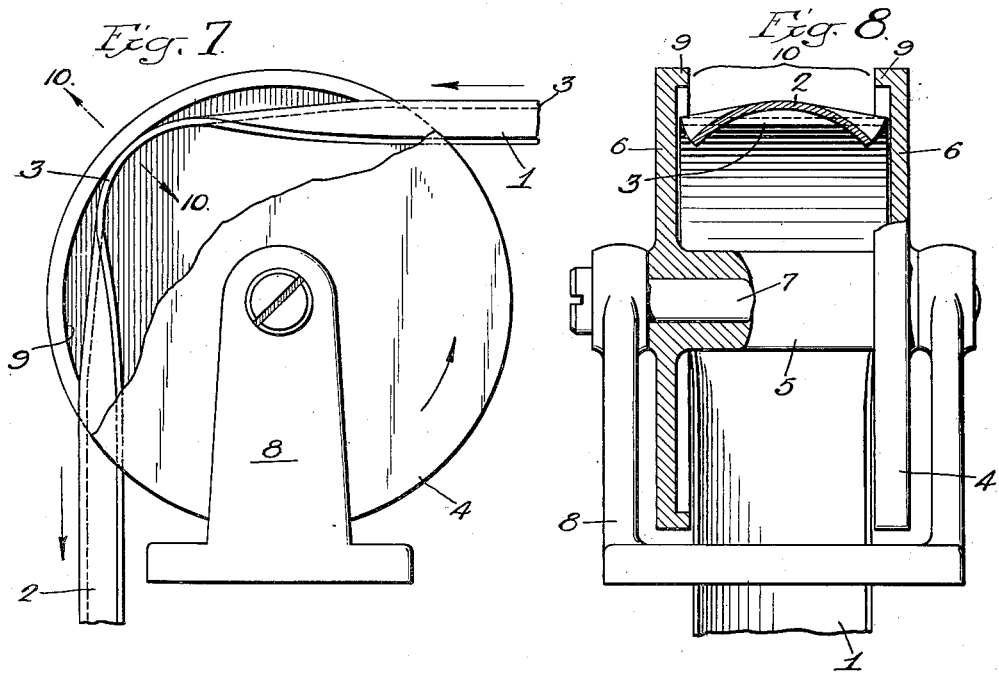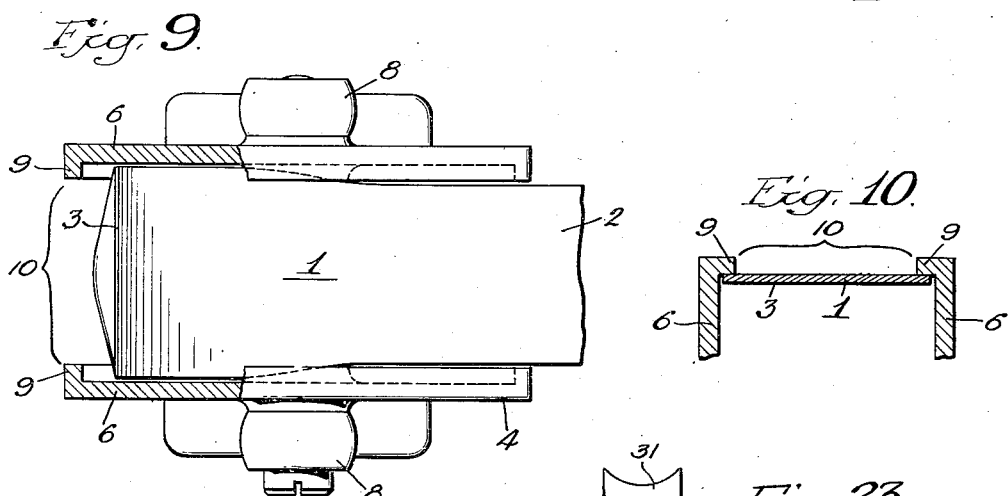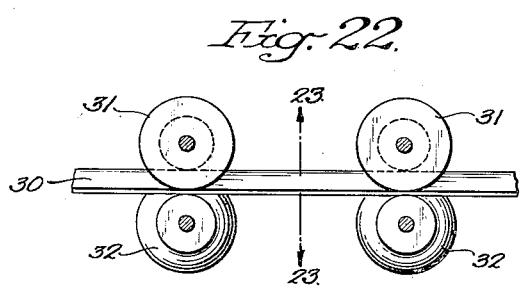

Oct. 6, 1936.  H. A. FARRAND  2,056,844
TRANSMISSION MECHANISM
Filed Dec. 26, 1935  5 Sheets—Sheet 3
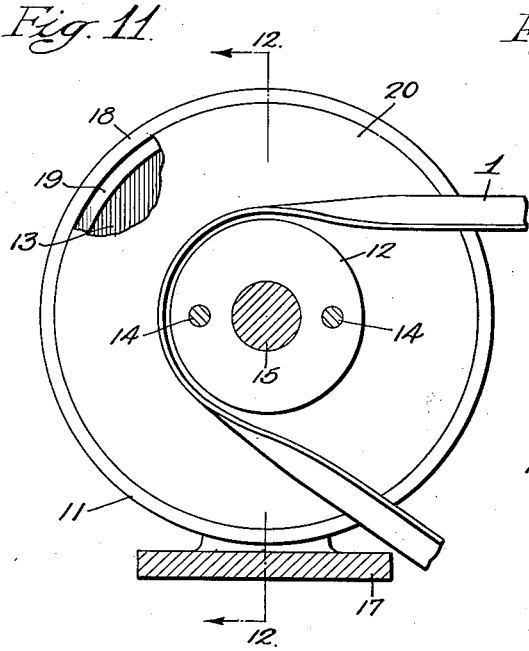
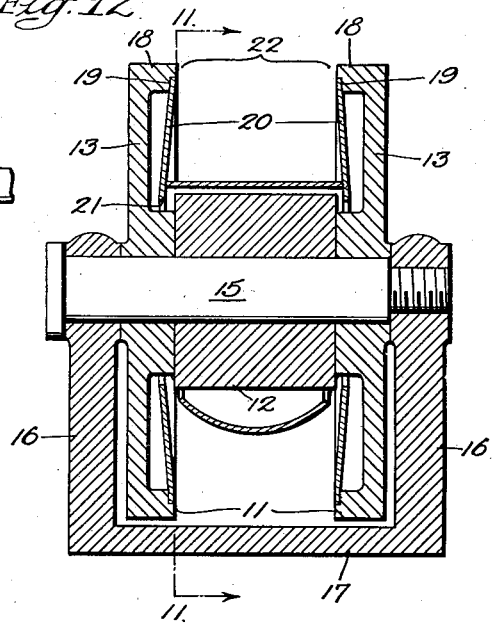
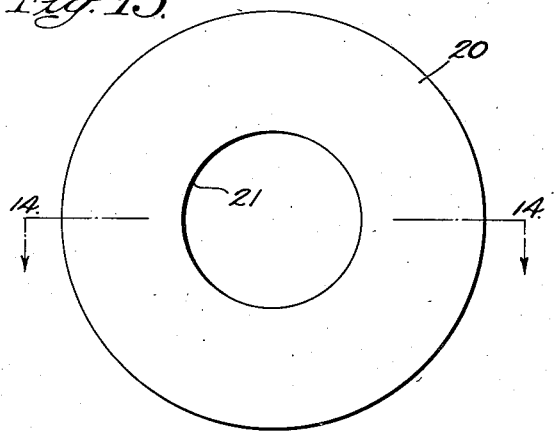
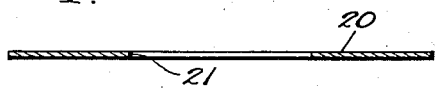
Inventor
Hiram A. Farrand
By his Attorneys
Howson & Howson Oct. 6, 1936.    H. A. FARRAND    2,056,844
TRANSMISSION MECHANISM
Filed Dec. 26, 1935    5 Sheets-Sheet 4
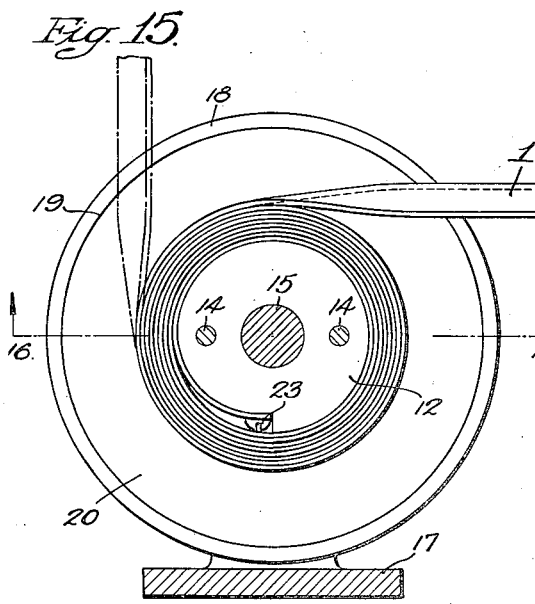
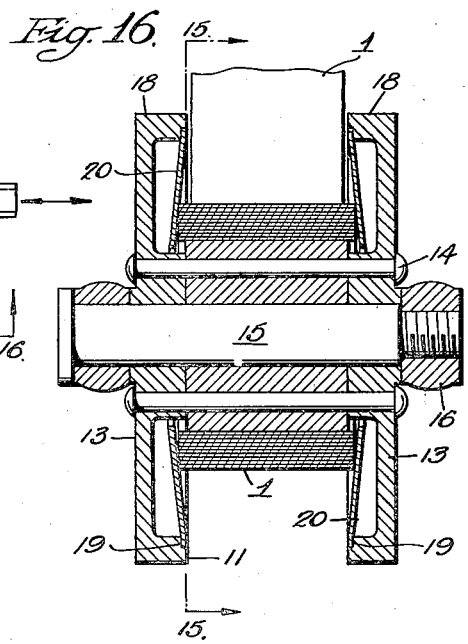
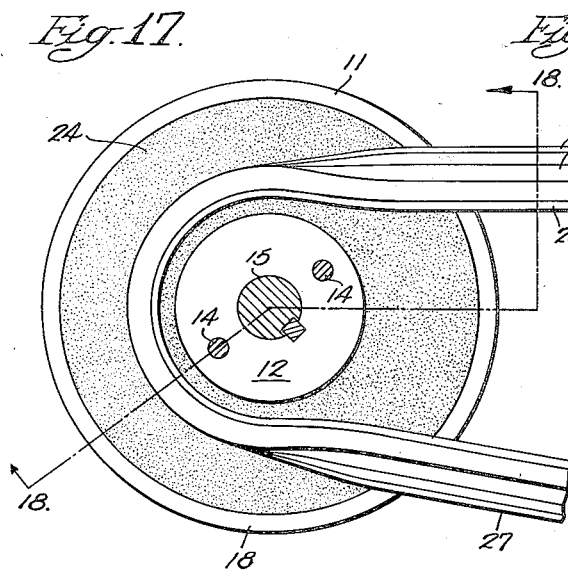
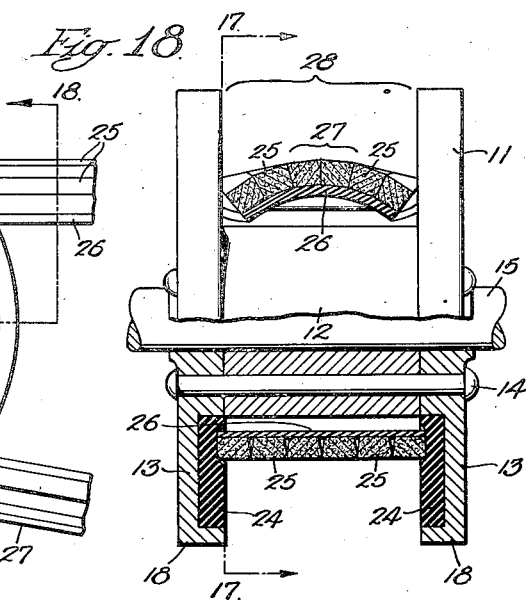

Oct. 6, 1936.  H. A. FARRAND  2,056,844
TRANSMISSION MECHANISM
Filed Dec. 26, 1935    5 Sheets-Sheet 5

Inventor
Hiram A. Farrand
by his Attorneys
Howson & Howson

Patented Oct. 6, 1936

2,056,844

UNITED STATES PATENT OFFICE 2,056,844

TRANSMISSION MECHANISM

Hiram A. Farrand, Berlin, N. H., assignor to Hiram A. Farrand, Inc., Berlin, N. H., a corporation of New Hampshire Application December 26, 1935, Serial No. 56,289

19 Claims. (Cl. 74—229)

This invention relates to new and useful improvements in transmission mechanisms and more particularly to devices of that character by means of which a force or direction of motion may be transmitted from one point to another through rectilinear and curvilinear courses.

The invention contemplates the provision of a force transmitting and/or motion direction changing mechanism employing resilient or flexible strips or belts having a transverse concavo-convex cross section shape during normal rectilinear travel thereof and a substantially flat planar cross-section shape during curvilinear travel thereof together with certain cooperating elements and mechanisms for guiding and controlling operation and movement of such strips or belts.

The principal object of the present invention is to provide a transmission mechanism of the character set forth which is novelly constructed and arranged for any adaptation and use involving the transmission of power or force or the change of the direction or course of motion as for example from a rectilinear to a curvilinear course and/or vice versa.

A further object of the invention is to provide a transmission mechanism of the character set forth having novel means for controlling operation of such mechanism to render the same effective for use in many and divers fields not heretofore available.

A further object of the invention is to provide a mechanism of the stated character wherein frictional resistance has been reduced to a minimum so as to render available the maximum force or power inherent therein.

A still further object of the invention is to provide a mechanism of the type set forth wherein the axes of the direction of movement of the component parts are substantially parallel so that any axes of rotation embodied therein may be similarly related.

A more specific object of the invention is to provide a mechanism of the stated character embodying a coil of resilient non-planar strip or strips constructed and arranged so that the storage and release of the energy inherent therein may be effectively employed to counterbalance or overcome a force acting in opposition thereto.

Other objects of the invention and the features and details of the invention are set forth hereinafter and shown in the accompanying drawings, in which:

Fig. 1 is a fragmentary side elevational view of a resilient normally concavo-convex strip showing the same in both a rectilinear and curvilinear course.

Fig. 2 is a view in section on line 2—2, Fig. 1, showing the concavo-convex cross section shape of the strip in a rectilinear course.

Fig. 3 is a view in section on line 3—3, Fig. 1.

Fig. 4 is a view similar to the disclosure in Fig. 1 showing an elastic concavo-convex strip to which is secured a plurality of parallel flexible non-elastic elements longitudinally thereof to provide a composite structure.

Fig. 5 is a view in section on line 5—5, Fig. 4.

Fig. 6 is a view in section on line 6—6, Fig. 4.

Fig. 7 is a view in side elevation of a mechanism for deflecting or changing the direction of linear motion of a normally concavo-convex strip operating under a compressive force, a portion of said mechanism having been cut away to better illustrate the construction and operation thereof.

Fig. 8 is an end elevational view of the disclosure in Fig. 7, wherein certain portions of the mechanism have been cut away to better illustrate certain structural details thereof.

Fig. 9 is a view in plan of the disclosure in Fig. 7, wherein a portion of the mechanism has been cut away to illustrate certain details and features of the invention.

Fig. 10 is a view in section on line 10—10, Fig. 7.

Fig. 11 is a view in section on line 11—11, Fig. 12.

Fig. 12 is a view in section on line 12—12, Fig. 11.

Fig. 13 is a view in side elevation of an annular spring plate employed in certain instances in the invention.

Fig. 14 is a view in section on line 14—14, Fig. 13.

Fig. 15 is a view in section on line 15—15, Fig. 16.

Fig. 16 is a view in section on line 16—16, Fig. 15.

Fig. 17 is a view in section on line 17—17, Fig. 18.

Fig. 18 is a view in section on line 18—18, Fig. 17.

Fig. 22 is a view similar to Figs. 1 and 4, but showing a strip or belt composed of inert flexible material; and Fig. 23 is a transverse sectional view taken on the line 23—23, Fig. 22.

Figure 19:
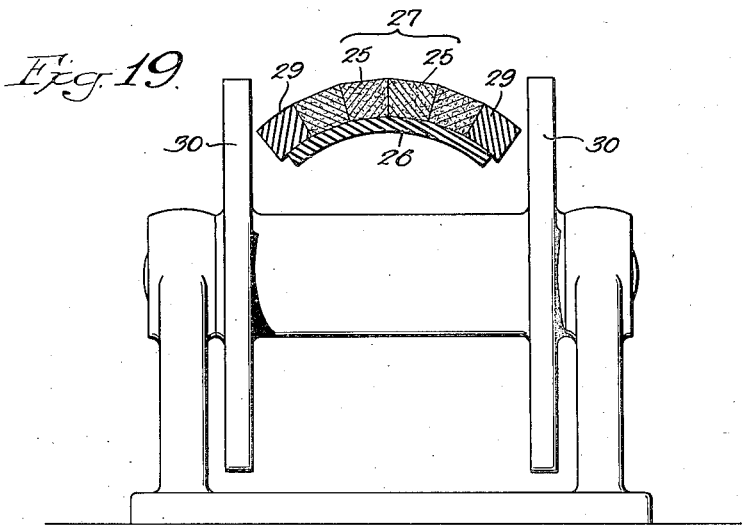
Fig. 19 is a view in elevation of a modification of the invention together with a composite strip and showing the cross section shape of the latter in its normal form.

Referring now to the drawings, and more particularly to Figs. 1, 2 and 3 thereof, reference numeral 1 designates a normally concavo-convex strip or ribbon-like structure composed of spring steel or other resilient material. The cross section shape or configuration of the strip or ribbon in its normal or rectilinear state is substantially concavo-convex as indicated at 2, but when bent or coiled receives a transverse flexure throughout the region of the bend which distorts the normal concavo-convex cross section shape thereof into a substantially flat planar cross section shape indicated at 3, due to the longitudinal flexure produced by such bending or coiling. When released or unrestricted the strip or ribbon 1 assumes a normal rectilinear position due to the inherent natural tendency thereof to return to its arcuate concavo-convex cross section shape, and this natural tendency re-acts to straighten said strip or ribbon longitudinally and stiffen the same against longitudinal buckling under compressive stress.

The present invention is predicated upon the fact that when a strip or ribbon 1 of the foregoing character is bent or coiled, the same assumes a substantially planar cross section shape, the extended width of which is greater than the overall width of said strip in the normal or rectilinear relationship wherein the cross section shape is substantially concavo-convex. Consequently, it will be seen therefore, that by providing means adjacent the edges of a strip of the above character arranged so as to engage the side edges thereof when extended by bending or coiling the same, linear movement of said strip may be effectively controlled.

It will be observed by reference to the drawings that in passing from a rectilinear to a curvilinear course or vice versa, the strip or ribbon structure 1 assumes a warped transitional cross section shape which varies progressively between the cross section shapes of the strip in the rectilinear or curvilinear course, and this transitional cross section shape remains substantially constant during any occurrence thereof substantially as do the cross sectional configurations of the structure during said rectilinear and curvilinear courses thereof respectively. Furthermore, the radius of curvature of the strip 1 at a bend or curvature therein does not vary and remains constant irrespective of the angular degree of bending of the strip, the only variation occurring in the circumferential length of the bend, coil, or other curvilinear course through which the same passes. Therefore, it will be seen that the cross section shape of the strip 1 during the aforementioned transitional period between true curvilinear and rectilinear positions pursues the arc of curvature of the bend or coil in the strip regardless of the direction of movement thereof and simulates in effect a wave formation which appears to move along said strip at the rate of linear travel thereof. These inherent characteristics of the concavo-convex strips of the present character are important and should be constantly borne in mind in connection with the description of the invention as the same will hereinafter be developed.

Concavo-convex resilient strips of the character disclosed, are capable not only of sustaining tensile stress but embody also a capacity to resist longitudinal buckling as the result of a compressive force or stress exerted longitudinally thereon. Therefore, it will be seen that such a force or stress may be effectively transmitted by the strip in its normal state. However, difficulty is encountered in the transmission of the force through a bend or curvature in the strip since the same is incapable of standing up under the same amount of compressive stress due to the flat planar cross section shape thereof at said bend or curvature.

Referring now particularly to Figs. 7, 8, 9 and 10 of the drawings, a novel mechanism or apparatus is disclosed which may be effectively employed to transmit a compressive force or other power exerted longitudinally of a normally concavo-convex strip 1 in a rectilinear course thereof, said force or power being transmitted through the entire length of said strip from one end or intermediate point to the other end thereof, as for example, passing from the aforementioned normal or rectilinear course through a bend or coil therein to another normal rectilinear course at the other side of said bend or coil in such a manner that the entire course of movement of the strip lies in a common plane which need not be departed from. In the device illustrated, 1 is the resilient normally concavo-convex strip or ribbon previously described and shown in Figs. 1 to 3 inclusive of the drawings. A wheel or pulley designated generally as 4 and comprising a hub 5 intermediate spaced radial flanges or webs 6, is rotatably mounted upon an arbor 7 supported by a standard 8, the spaced radial flanges 6 being provided at their peripheries with inwardly projecting portions 9. The distance between the inner adjacent faces of the radial flanges 6 is determined with reference to the width of the particular concavo-convex resilient strip or ribbon 1 to be employed, and is somewhat greater than the width of said strip at a bend therein, the cross section shape of which is flat or planar as at 3, and, of course, greater than the over-all width of the strip during its normal rectilinear state wherein the cross section shape is substantially concavo-convex, as at 2. Thus it will be seen that sufficient clearance is provided between the inner adjacent faces of the radial flanges 6 to allow free passage therebetween of the maximum extended width of a strip of the present nature. On the other hand, the peripheral portions 9 on the radial flanges 6 project inwardly from the adjacent surfaces of the latter a distance sufficient to provide a space or gap 10 therebetween which while greater than the over-all width of the strip 1 in its normal concavo-convex state, is nevertheless shorter or less than the extended width of said strip at a curve or bend therein wherein its cross section shape is substantially flat and planar. Thus it will be seen that while the space or opening 10 between the adjacent faces of the inwardly projecting flanges 9 provides sufficient clearance for free passage of the strip 1 about the wheel or pulley 4 in its normal concavo-convex form, these same inwardly projecting portions 9 function to retain said strip 1 within the confines of the periphery of said wheel when the same is bent or coiled and the cross section thereof assumes a flat planar configuration, in which case the edges of the strip 1 are extended laterally to a position underlying the inwardly projecting portion 9 as shown in Fig. 10 of the drawings. In this manner a compressive force operating longitudinally of the strip or ribbon 1 at one side of the bend may be brought to bear upon the bend or coil in said strip and move the same radially until the extended edges thereof in its flat planar cross section shape engage the inwardly projecting portions 9 which will effectively support the same at such a bend or curvature and transmit or direct the force and movement to the normal rectilinear course of the strip at the other side of the bend, the wheel 4 revolving in timed relation with respect to the linear travel of said strip or ribbon and functioning after the manner of a frictionless bearing or floating guide therefor. With a mechanism or device of the character shown in Figs. 7, 8, 9 and 10 of the drawings, a compressive force longitudinally of the strip 1 originating at one end of a rectilinear course thereof, may be transmitted therethrough and deflected by a bend or curvature therein to another point at any desired angle within the plane of and with respect to the rectilinear course of said strip in which the motion or compressive force originated.

It will be obvious that numerous applications of mechanisms of the character just described, may be provided to effectively transmit and deflect a linear movement or force to a distant point as for example, a device of the character illustrated in Figs. 11 and 12 of the drawings, wherein a wheel designated generally as 11 is provided and comprises a hub portion 12 interposed between radial flanges 13 which are secured to each end thereof by means of rivets, bolts, or the like 14. The hub 12 and flanges 13 are rotatably mounted upon an arbor 15 supported by means of a standard 16 having a base 17. As in the disclosure in Figs. 7, 8, 9 and 10, the radial flanges 13 in the present instance are provided with inwardly projecting portions comprising the horizontal peripheral flanges 18 and annular spring plates 20, the outer peripheral edges of which are supported by the adjacent faces of said flanges, said flanges being stepped as at 19 to receive said peripheral edge portions of said annular spring plates 20 shown in detail in Figs. 13 and 14 of the drawings. The diameter of the opening 21 in each of the annular spring plates 20 is less than the diameter of the hub 12 and the circumferential end surface portions of the latter function to retain said spring plates 20 seated in the steps 19 in the flanges 18, sufficient clearance being provided between the end or side faces of the hub 12 and the inner adjacent faces of the radial flanges 13 to permit outward axially flexing of the inner peripheral portion of each of the annular spring plates 20 in the course of operation of the mechanism.

In this ramification of the invention, the distance or space 22 between the inner adjacent faces of the annular spring plates 20 and the inwardly projecting flanges 18 is greater than the width of the resilient strip or ribbon 1 in its normal concavo-convex state to permit free passage thereof in that state between said spring plates 20 and flanges 18. On the other hand, the distance or space 22 between the spring plates 20 and flanges 18 is less than the extended width of the resilient strip at a bend or curvature therein having a flat cross section shape which is substantially planar. Consequently, the strip 1 moving longitudinally in its normal concavo-convex form will pass freely between the flanges 18 and spring plates 20, but when bent or coiled the overall width of said strip is increased due to the cross section shape at the bend, so that the side edges thereof engage the inner adjacent faces of said spring plates 20, thus laterally flexing the inner peripheral portions of the same in the manner indicated in Fig. 12 of the drawings. The space or distance between the outer peripheral portions of the spring plates 20 is now less than the width of the strip at the bend or curvature therein and said plates diverge inwardly to the point of contact of said plates with said strip, so that the course of the latter is effectively controlled and maintained uniform throughout the entire length of the strip and will transmit linear motion or a force exerted on the strip through the bend or curvature therein without displacement.

A device or mechanism similar to that just described, may be employed to effectively coil a normally concavo-convex resilient strip or ribbon 1 of the present character in the manner disclosed in Figs. 15 and 16 of the drawings, and by merely attaching one end of said strip to the hub 12 as for example, by means of a screw or the like 23, then with the remainder of the strip 1 supported substantially tangent to the periphery of the hub 12 as shown, if a force be exerted on said strip 12 longitudinally thereof, in the direction of said hub, the latter will rotate on its arbor 15, and carry the attached end of the strip with it to form the successive overlying convolutions of a coil until said entire strip is wound thereon. As each successive convolution is formed the spring plates 20 are flexed further outwardly from the hub 12 by the edges of the outermost convolution of the coil and the pressure exerted thereon by said spring plates 20 increases with the number of said convolutions to effectively maintain the same under complete control.

As previously described, a normally concavo-convex strip or ribbon 1 of the resilient character, when coiled, has an inherent tendency to return to its normal rectilinear state, the cross section shape of which is substantially concavo-convex, and a coil formed in the manner disclosed in Figs. 15 and 16 of the drawings may be advantageously employed as a reservoir or storage means for the energy necessarily expended in overcoming that force which is constantly tending to return the strip 1 to its normal concavo-convex cross section and rectilinear form and which, despite the number of convolutions of the coil, remains constant and uniform throughout the winding and unwinding of the entire coil. In strips of the resilient character, this force manifests itself by a tendency to unwind the strip 1 from the coil, not in the same manner as a clock spring, wherein the entire coil or at least a goodly portion thereof becomes more or less loose immediately upon either the inner or the outer end of the spring being permitted to move against and apply the stored-up energy of the spring to the work for which the spring is intended and wherein all the convolutions of the spring revolve more or less simultaneously about the axis of the coil as the coil unwinds, but, by the coil remaining stationary and the transitional portion of the spring, i. e. that portion of the strip disposed intermediate the flat planar cross section part thereof lying in the coil and the concavo-convex cross section in the rectilinear part of the strip tangentially extending from the outer convolution of the coil, moving progressively along the outer convolution and causing the rectilinear portion of the strip to swing about the axis of the coil, always tangential to the coil, as the strip unwraps itself from the coil convolution after convolution while all the underlying convolutions remain inert and tightly wrapped one upon another. This unwrapping action of the strip is resisted in the present instance by the spring plates 20. However, should this control of the coiled strip be released, the inherent force therein would cause the strip to unwind in the manner noted above. This reaction would proceed in an orderly fashion with the inherent force of the strip effective always and only in the transitional portion of the strip lying between the curvilinear and rectilinear courses of the strip 1 so that as the strip, guided at its free end into a definite path, unwinds from the coil said strip assumes its normal concavo-convex cross section shape and moves in a rectilinear course tangentially of the hub 12.

However, in the device shown in Figs. 15 and 16, the restriction placed upon the coil by the spring plates 20 remains constant and uniform during coiling and uncoiling of the strip. Therefore, the inherent energy stored-up in the coil becomes effective as a counter force against any force tending to move the rectilinear portion of the strip toward the coil and into the curvilinear course represented by the convolutions of the coil.

The friction encountered in the mechanism disclosed in Figs. 15 and 16 of the drawings is substantially negligible and a force or energy released in the foregoing manner approximates the energy consumed in the formation of the coil on the hub 12 and is substantially constant throughout the entire unwinding of the successive convolutions of the coil. This is similar to the result obtained from a weight suspended by a cord or the like wound upon a rotatable drum and, of course, may be effectively used with beneficial results in lieu of such analogous mechanism and particularly where a compressive force or push is preferred in contrast to a tensile stress or pull upon the strip 1. Such a mechanism may be employed to advantage also in any apparatus or mechanism in which an extensible rod or brace structure may be required.

It will be obvious that in the transmission of power or motion from a resilient strip 1 of the present character to a wheel, pulley or the like, the normally thin edge of said strip presents very little tractive surface for contact with the spring plates 20 and in order to increase the traction at this point of contact it may be desirable to provide a wheel or pulley mechanism of the character disclosed in Figs. 17 and 18 of the drawings, which while substantially similar to that disclosed in Figs. 15 and 16, differs therefrom in that the spring plates 20 are omitted and annular elements 24 of a compressible or elastic nature such as leather, rubber or the like, are disposed in the recesses in the inner adjacent faces of the radial flanges 13 inwardly of the peripheral flanges 18 thereof and arranged so that the inner adjacent faces of said elements 24 are co-planar with the inner adjacent edge surfaces of said flanges 18.

Also for the purpose of providing increased tractive surfaces along the side edges of a resilient strip or ribbon, it may be desirable in certain instances to secure a plurality of flexible strips 25 composed of ordinary belting material such as leather, canvas, or the like, upon the convex surface of a non-planar resilient strip or ribbon 26 of the present character, said strips 25 extending longitudinally thereof in substantially abutting relation and forming a composite normally concavo-convex strip or ribbon 27. The resilient concavo-convex strip or ribbon 26 in this instance, is preferably of an elastic nature so that, when the composite strip 27 is in its normal concavo-convex state, the flexible strips 25 secured thereto are in contact with each other and the planes of the side surfaces of each thereof converge in the direction of the concave side of the strip or ribbon-like structure 26 as shown in Fig. 5 of the drawings. Consequently, when the composite strip 27 is bent or coiled, the transverse flexure received thereby distorts the concavo-convex cross section shape thereof into a cross section shape which is flat and planar, thus in effect extending the strip 26 transversely thereof together with the strips 25, as shown in Fig. 6 of the drawings. The characteristics of such a composite strip 27 are substantially the same as those previously described in connection with the strip or ribbon 1, including the characteristic tendency of such a structure to return to its normal concavo-convex non-planar form when bent or coiled.

In Figs. 17 and 18 of the drawings, the distance or space 28 between the inner adjacent edge surface of the flanges 18 and the elements 24 with respect to the normal and extended over-all widths of the composite strip or ribbon 27 is substantially the same as that set forth hereinbefore with regard to the strip 1 in Figs. 11 and 12, and in its normal concavo-convex form said strip 27 is free to pass between or about the wheel or pulley, but when bent or coiled, the extended side edges thereof and the outermost strips 25 engage the inner adjacent faces of the elements 24, and compress the same to give a tractive effect which effectively retains the strip or ribbon 27 in a proper course while moving under the influence of either a longitudinally exerted tensile or compressive stress, or force.

Figure 20:
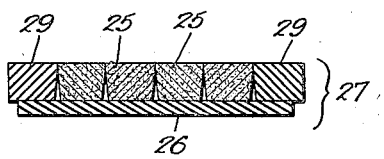
Fig. 20 is a view in section showing the cross section shape of the strip element disclosed in Fig. 19 in a curvilinear course.
Figure 21:
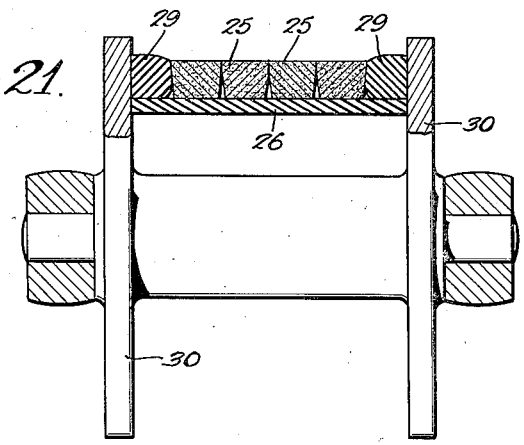
Fig. 21 is a view similar to the disclosure in Fig. 19 showing the cross section shape of the composite strip element in its curvilinear course and the manner in which the same cooperates with a control mechanism of the present character.

It will also be apparent that a substantially similar effect may be obtained by providing outer edge strip members 29 of a compressible or elastic nature in the composite strip 27 and allowing the same to engage directly the inner adjacent faces of radial flange elements 30 in the manner shown in Figs. 20 and 21 of the drawings. Also, both the edge strip elements of the belt or ribbon and the adjacent contacting surfaces of the radial flanges may be composed of compressible or elastic material so long as an arrangement is provided which will give a co-efficient of friction sufficient to maintain a resilient tape or ribbon in operative relation with respect to the periphery of a wheel or pulley mechanism.

While the resilient normal concavo-convex strip 1 has been illustrated and described in certain ramifications of the invention and the composite strip 27 in other ramifications thereof, it will be obvious that either of said strips 1 or 27 may be effectively employed with any or all of the several modifications of the invention herein set forth, and the disclosure of either one or the other of said strips 1 or 27 in a particular ramification of the invention has been resorted to in order to expedite illustration and description of the invention.

Furthermore, while several specific forms of the invention have been set forth for purposes of description, it is not intended that the same be precisely limited thereto but that modifications both in arrangement and construction thereof may be incorporated within the scope of the annexed claims, for example, in some instances and under certain conditions the transmission strip may be composed of an inert flexible material having neither the resiliency of the strip 1 nor the elasticity of the strip 26 and in order to maintain the strip in a compressive stress-resisting condition the inert strip 30 (see Figs. 22 and 23) may be maintained throughout its rectilinear course or courses in a concavo-convex cross sectional shape by any suitable guide or converting means, such as a concaved roller 31 operating against the convexed face of the strip and a convexed roller 32 operating against the concaved face of the strip, the only requisite being that the material of the strip have sufficient thickness and/or resilient stiffness as to prevent crumbling intermediate spaced sets of the cooperating concaved and convexed guide rollers. As in the cases of the strips 1 and 27, a longitudinal bend about an axis transverse to the strip 30 will convert the strip from its concavo-convex cross sectional shape into a flat planar cross sectional shaft suitable for coiling or directional change in the course of the strip.

While the transmission elements 1, 27 and 30 have been referred to as strips, i. e., a piece having definite length between opposite non-connected ends, it is within the scope of the invention to make these elements in endless or belt form when and where such an element is desired and it will be understood that in the appended claims reference to these elements as a strip or strips or a continuous strip or strips the same is intended to cover either the endless or the disconnected end type of element.

It will be understood from the above that the transmission element, be it the strip 1, 27 or 30, is converted from the concavo-convex cross sectional form, in any longitudinally rectilinear section of the predetermined course in which the strip is intended to be moved longitudinally, to the flat planar cross sectional form which the strip assumes in and throughout any curvilinear section of the course, by forceably bending a rectilinear portion of the strip between two points spaced one from the other along said rectilinear portion of the strip; and that such bending of the strip, to maintain a curvilinear portion in the strip, must be produced and maintained by suitable means located at one or both sides, i. e. preceding and/or superceding the bend in the strip. For example, a device such as that shown in Figs. 22 and 23 may be used before and after the bend of the strip in Fig. 7 and wherein the bend or curvilinear section of the courses is maintained in predetermined relation to two rectilinear sections of the course by the rotary elements 4, or wherein the two remotely disposed points on the strip are attached to guides or elements moving in rectilinear and/or curvilinear courses respectively disposed at or in relatively different angles and/or arcs with respect to each other.

In the form of apparatus shown in Fig. 15 the one point of the strip is guided in a circular path by rotation of the core 12 while the other remotely situated point along the strip may be attached to any suitable device or guide moving or movable in a plane or arc tangent to the cone 12, wherein and whereby a bend, i. e. a curvilinear portion of the strip constituting a curvilinear section of the course is maintained in predetermined relation to a rectilinear portion of the strip which constitutes a rectilinear section of the course.

In those forms of the invention shown in Figs. 17, etc., the bend or curvilinear portions of the strip and course respectively may be produced and maintained by making the strip in belt or endless form, and by using two or more of the devices of Fig. 17, for example, at relatively spaced points along the course.

From the above, it will be clear that in each instance some means is provided for producing and maintaining a bent or curvilinear portion in the strip and that some means is provided for maintaining the curvilinear section of the course represented by the curvilinear portion of the strip in predetermined relation to a rectilinear section of the course as exemplified by a rectilinear portion of the strip.

I claim:

1. In a transmission mechanism, the combination of a transmission element capable of change in its cross sectional form in predetermined phases respectively of longitudinal travel thereof, and means constructed and arranged to engage said element while in the cross sectional form peculiar to one of said phases to effect transmission of power and motion by said element to and through said means with said means functioning in an intermediary capacity between the point of application of said power and motion to said element and the point of utilization of the power and motion delivered by said element.

2. In a transmission mechanism, the combination of a transmission strip capable of change from, to and between a concavo-convex cross sectional form in a longitudinally rectilinear phase of longitudinal travel thereof and a flat planar cross sectional form in a longitudinally curvilinear phase of said travel, and means constructed and arranged to engage the strip while in said curvilinear phase to effect transmission of power and motion by said strip to and through said means with said means functioning in an intermediary capacity between the point of application of power and motion to said strip and the point of utilzation of the power delivered by said strip.

3. In a transmission mechanism, the combination of a transmission strip capable of change from, to and between a concavo-convex cross sectional form in a longitudinally rectilinear phase of longitudinal travel thereof and a flat planar cross sectional form in a longitudinally curvilinear phase of said travel, and means constructed and arranged to engage the strip while in said curvilinear phase to effect transmission of power and motion by said strip to and through said means with said means functioning in an intermediary capacity to maintain said curvilinear phase of said course in predetermined relation to said rectilinear phase between the point of application of power and motion to said strip and the point of utilization of the power delivered by said strip.

4. In a transmission mechanism, the combination of a transmission strip capable of change from, to and between a concavo-convex cross sectional form in a longitudinally rectilinear phase of longitudinal travel thereof and a flat planar cross sectional form in a longitudinally curvilinear phase of said travel, and means constructed and arranged to engage the strip frictionally while in said curvilinear phase to effect transmission of power and motion by said strip to and through said means with said means functioning in an intermediary capacity between the point of application of power and motion to said strip and the point of utilization of the power delivered by said strip.

5. In a transmission mechanism, the combination of a transmission strip capable of change from, to and between a concavo-convex cross sectinal form in a longitudinally rectilinear phase of longitudinal travel thereof and a flat planar cross sectional form in a longitudinally curvilinear phase of said travel, and means constructed and arranged to engage the strip frictionally at the side edges of the planar cross section while in said curvilinear phase to effect transmission of power and motion by said strip to and through said means with said means functioning in an intermediary capacity between the point of application of power and motion to said strip and the point of utilization of the power delivered by said strip.

6. In a transmission mechanism, the combination of a transmission element capable of change in its cross sectional form in predetermined phases respectively of longitudinal travel thereof, means constructed and arranged to engage said element while in the cross sectional form peculiar to one of said phases to effect transmission of power and motion by said element to and through said means with said means functioning in an intermediary capacity between the point of application of said power and motion to said element at one end thereof and the point of utilization of the power and motion delivered by the opposite end of said element, and means operatively associated with the delivery end of said element for effecting a storage of the energy applied to the first said end of said element, whereby said stored energy becomes reactive in a reverse direction through said element to redeliver said stored energy at the first said end of said element upon cessation of the force initially applied thereto.

7. In a transmission mechanism, the combination of a transmission element capable of change in its cross sectional form in predetermined phases respectively of longitudinal travel thereof, and rotatable means including spaced rotary members arranged to provide an opening therebetween greater than the overall width of said element when in its cross sectional form peculiar to one of said phases and less than the overall width of said element when in its cross sectional form peculiar to another of said phases and confining the last said phase to a predetermined course during longitudinal travel of said element.

8. In a transmission mechanism, the combination of a transmission element capable of change in its cross sectional form in predetermined phases respectively of longitudinal travel thereof, and rotatable means including spaced rotary members having opposed effective surfaces for engagement with said element and arranged to provide an opening therebetween greater than the overall width of said element when in its cross sectional form peculiar to one of said phases and less than the overall width of said element when in its cross sectional form peculiar to another of said phases and confining the last said phase to a predetermined course during longitudinal travel of said element.

9. In a transmission mechanism, the combination of a transmission element capable of change in its cross sectional form in predetermined phases respectively of longitudinal travel thereof, and rotatable means including spaced rotary members having opposed effective surfaces for frictional engagement with said element and arranged to provide an opening therebetween greater than the overall width of said element when in its cross sectional form peculiar to one of said phases and less than the overall width of said element when in its cross sectional form peculiar to another of said phases and confining the last said phase to a predetermined course during longitudinal travel of said element.

10. In a transmission mechanism, the combination of a transmission element capable of change in its cross sectional form in predetermined phases respectively of longitudinal travel thereof, and rotatable means including spaced rotary members having opposed effective surfaces for frictional engagement with opposite edge surfaces respectively of said element and arranged to provide an opening therebetween greater than the overall width of said element when in its cross sectional form peculiar to one of said phases and less than the overall width of said element when in its cross sectional form peculiar to another of said phases and confining the last said phase to a predetermined course during longitudinal travel of said element.

11. In a transmission mechanism, the combination of a transmission element capable of change in its cross sectional form in predetermined phases respectively of longitudinal travel thereof, and rotatable means including spaced rotary members having opposed effective surfaces for engagement with opposite edge surfaces respectively of said element and arranged to provide an opening therebetween greater than the overall width of said element when in its cross sectional form peculiar to one of said phases and less than the overall width of said element when in its cross sectional form peculiar to another of said phases and confining the last said phase to a predetermined course during longitudinal travel of said element with at least one of each pair of said cooperatively engaging surfaces provided with frictional means for increasing the cohesion between said element and said rotatable means during the last said phase of longitudinal movement of said element.

12. In a transmission mechanism, the combination of a transmission element capable of change in its cross sectional form in predetermined phases respectively of longitudinal travel thereof, and rotatable means including spaced rotary members having opposed outwardly convergent surfaces for engaging said element and arranged to provide an opening therebetween greater than the overall width of said element when in its cross sectional form peculiar to one of said phases and less than the overall width of said element when in its cross sectional form peculiar to another of said phases and confining the last said phase to a predetermined course during longitudinal travel of said element.

13. In a transmission mechanism, the combination of a transmission element capable of change in its cross sectional form in predetermined phases respectively of longitudinal travel thereof, and rotatable means including spaced rotary members having oppositely extending annular flanges arranged to provide an opening therebetween greater than the overall width of said element when in its cross sectional form peculiar to one of said phases and less than the overall width of said element when in its cross sectional form peculiar to another of said phases and confining the last said phase to a predetermined course during longitudinal travel of said element.

14. In a transmission mechanism, the combination of a transmission element capable of change in its cross sectional form in predetermined phases respectively of longitudinal travel thereof, and rotatable means including spaced rotary members having opposed resilient surfaces for engaging the opopsite side edges of said element and arranged to provide an opening therebetween greater than the overall width of said element when in its cross sectional form peculiar to one of said phases and less than the overall width of said element when in its cross sectional form peculiar to another of said phases and confining the last said phase to a predetermined course during longitudinal travel of said element.

15. In a transmission mechanism, the combination of a transmission element capable of change in its cross sectional form in predetermined phases respectively of longitudinal travel thereof, and rotatable means including spaced rotary members having oppositely extending annular flanges arranged to provide an opening therebetween greater than the overall width of said element when in its cross sectional form peculiar to one of said phases and less than the overall width of said element when in its cross sectional form peculiar to another of said phases and resilient annular plates carried at their outer peripheral edges by said annular flanges respectively for engagement with the opposite side edges of the last said cross sectional form of said element and confining the last said phase to a predetermined course during longitudinal travel of said element.

16. In a transmission mechanism, the combination of an inherently resilient transmission element capable of change in its cross sectional form in predetermined phases respectively of longitudinal travel thereof, and means constructed and arranged to engage said element while in the cross sectional form peculiar to one of said phases to effect transmission of power and motion by said element to and through said means with said means functioning in an intermediary capacity between the point of application of said power and motion to said element and the point of utilization of the power and motion delivered by said element.

17. In a transmission mechanism, the combination of an inherently resilient transmission element having a normally concavo-convex cross sectional form wherein said element is capable of change in its cross sectional form in predetermined phases respectively of longitudinal travel thereof, and means constructed and arranged to engage said element while in the cross sectional form peculiar to one of said phases to effect transmission of power and motion by said element to and through said means with said means functioning in an intermediary capacity between the point of application of said power and motion to said element and the point of utilization of the power and motion delivered by said element.

18. In a transmission mechanism, the combination of an inherently resilient transmission element having a normally concavo-convex cross sectional form and composed of a laterally elastic base strip and a plurality of longitudinal facing strips secured thereto in substantially parallel relation to each other and wherein said element is capable of change in its cross sectional form in predetermined phases respectively of longitudinal travel thereof, and means constructed and arranged to engage said element while in the cross sectional form peculiar to one of said phases to effect transmission of power and motion by said element to and through said means with said means functioning in an intermediary capacity between the point of application of said power and motion to said element and the point of utilization of the power and motion delivered by said element.

19. In a transmission mechanism, the combination of a transmission element comprising an inherently inert strip capable of change in its cross sectional form in predetermined phases respectively of longitudinal travel thereof, means for producing and maintaining a longitudinal stiffening cross sectional form in said strip in one of said phases of longitudinal travel of said element, and means constructed and arranged to engage said element while in the cross sectional form peculiar to one of said phases to effect transmission of power and motion by said element to and through said means with said means functioning in an intermediary capacity between the point of application of said power and motion to said element and the point of utilization of the power and motion delivered by said element.

HIRAM A. FARRAND.